(12) United States Patent
Dubas (10) Patent No.: US 7,146,933 B1
(45) Date of Patent: Dec. 12, 2006

(54) CALVING ENCLOSURE

(76) Inventor: Bryan D. Dubas, 1027 N. 3rd St., Fullerton, NE (US) 68638

( * ) Notice: Subject to any disclaimer, the term of this patent is extended or adjusted under 35 U.S.C. 154(b) by 97 days.

(21) Appl. No.: 10/939,827

(22) Filed: Sep. 13, 2004

(51) Int. Cl.
*A01K 1/00* (2006.01)
(52) U.S. Cl. .................. 119/519; 119/516; 119/504
(58) Field of Classification Search ............... 119/519, 119/522, 524, 516, 502–504, 512–514, 840, 119/841, 843, 405, 846–849, 472–474, 416, 119/444, 445, 14.11
See application file for complete search history.

(56) References Cited

U.S. PATENT DOCUMENTS

| | | | | |
|---|---|---|---|---|
| 2,786,449 A | * | 3/1957 | Dahlerup | 119/734 |
| 3,237,600 A | * | 3/1966 | Behrens et al. | 119/506 |
| 4,201,157 A | * | 5/1980 | Lambert | 119/752 |
| 4,829,936 A | * | 5/1989 | Mollhagen | 119/843 |
| 4,924,813 A | * | 5/1990 | Bixler et al. | 119/848 |
| 5,115,763 A | * | 5/1992 | Wilson | 119/512 |
| 5,174,240 A | * | 12/1992 | Darvill | 19/400 |
| 5,381,757 A | * | 1/1995 | Putney | 119/512 |
| 5,924,385 A | * | 7/1999 | Cossel | 119/512 |
| 6,021,742 A | * | 2/2000 | Cummings | 119/843 |
| 6,067,940 A | * | 5/2000 | Holder | 119/512 |
| 6,609,477 B1 | * | 8/2003 | White | 119/512 |
| 6,964,245 B1 | * | 11/2005 | Beck | 119/512 |

FOREIGN PATENT DOCUMENTS

EP     0499428 A1 * 11/1991

\* cited by examiner

*Primary Examiner*—Andrea M. Valenti (57) ABSTRACT

A calving enclosure which is adapted to be placed permanently on the ground or which may be moved from one location to another for use during calving operations. The enclosure includes a pivotal alleyway which may be moved from a stowed position to an operative position so that the width of the enclosure is reduced for transport purposes. The enclosure includes multiple confinement pens or areas as well as a tack or warming room and a headgate assembly.

23 Claims, 12 Drawing Sheets

CALVING ENCLOSURE

BACKGROUND OF THE INVENTION

1. Field of the Invention

This invention relates to a calving enclosure and more particularly to a calving enclosure which is preferably portable so that it may be transported from one pasture location to another pasture location to enable pregnant cows to be placed therein during the birth of their calves.

2. Description of the Related Art

In the Midwest, and other locations, calves are born during inclement weather in remote pastures which do not have confinement pens or sheds into which the pregnant cows may enter to give birth to their calves. If the calves are born in an unsheltered area, the calves may die due to exposure. Further, the cows frequently need assistance in the birth of their calves.

There is therefore a need to provide a cattle confinement shed or pen, which is preferably transportable from one pasture area to another, so that pregnant cows may enter the same to give birth to their calves. There is also a need to provide a cattle confinement shed or pen which is adapted to accommodate a plurality of pregnant cows together with a shed or pen the configuration of which may be conveniently and quickly varied to handle various calving situations. Additionally, there is a need for a transportable cattle confinement shed or pen which may be converted from an operative configuration to a more narrow transport position so that the shed or pen may be moved over a road from one location to another.

SUMMARY OF THE INVENTION

A calving enclosure is described which is preferably transportable from one location to another but which may be permanently left in one location. The calving enclosure of this invention includes a generally horizontally disposed lower frame having a rearward end, a forward end, a first side and a second side and which includes a rear frame member, a front frame member, a first side frame member and a second side frame member. An upper frame is positioned above the lower frame and has a rearward end, a forward end, a first side and a second side. The upper frame includes a transversely extending rear frame member, a transversely extending front frame member, transversely extending intermediate frame members, a longitudinally extending first side frame member, a longitudinally extending second side frame member and a pair of longitudinally extending intermediate frame members. The enclosure also includes a plurality of upstanding, horizontally spaced-apart first supports which have upper and lower ends with the lower ends of the first supports being secured to the first side frame member of the lower frame. The upper ends of the first supports are operatively connected to the transversely extending frame members of the upper frame inwardly of the first side frame member of the upper frame. The enclosure also includes a plurality of upstanding, horizontally spaced-apart second supports which have upper and lower ends with the lower ends of the second supports being secured to the second side frame member of the lower frame. The upper ends of the second supports are secured to the transversely extending frame members of the upper frame. The first and second supports have a height sufficient to permit persons and cows to move within the enclosure. A front wall is provided at the forward ends of the lower and upper frames and a rear wall is provided at the rearward ends of the lower and upper frames. An upstanding first side wall is provided at the first side of the lower frame and an upstanding side wall is provided at the second side of the lower frame. A plurality of panels are selectively pivotally secured to and extend between at least some of the first supports and the second supports to define a plurality of pens or areas within the enclosure.

The first side wall is comprised of a plurality of selectively pivotal movable panel members with those panels being selectively removably secured to the first supports. In the preferred embodiment, the first side frame member of the upper frame is disposed laterally outwardly of the first side frame member of the lower frame. In the preferred embodiment, a roof is supported upon the upper frame and siding or sheeting is secured to the front wall, the rear wall, and the second side wall.

In the preferred embodiment, the enclosure includes a selectively vertically movable wheel assembly, movable between first and second positions, for raising the enclosure from the ground for transport purposes. The preferred embodiment also includes a hydraulically pivotal hinge tongue at the forward end of the enclosure for raising and lowering the forward end of the enclosure. In the preferred embodiment, an alleyway assembly is selectively pivotally mounted adjacent at least some of the first supports with the alleyway assembly being movable from a stowed position to an operative position to create an alleyway, having forward and rearward ends, outwardly of the first side wall. Additionally, in the preferred embodiment, a headgate is provided at the rearward end of the alleyway.

It is therefore a principal object of the invention to provide an improved calving enclosure.

Still another object of the invention is to provide an improved calving enclosure which includes a wheel means thereon so that the enclosure may be moved from one location to another.

Still another object of the invention is to provide a calving enclosure which includes a retractable wheel assembly and a powered pivotal hitch so that the enclosure may be positioned on the ground or raised therefrom for transport purposes.

Yet another object of the invention is to provide a calving enclosure including an alleyway assembly which is movable from an operative position to a stowed position for transport purposes.

Still another object of the invention is to provide a calving enclosure, the configuration of which may be easily varied to make the enclosure extremely versatile.

Yet another object of the invention is to provide a calving enclosure which includes a tack room which serves as an equipment room or which may be used to warm calves.

Still another object of the invention is to provide a calving enclosure which is readily configured in various pen and alleyway configurations.

A further object of the invention is to provide a calving enclosure which is durable in use, refined in appearance and economical of manufacture.

These and other objects will be apparent to those skilled in the art.

DETAILED DESCRIPTION OF THE INVENTION

The calving enclosure of this invention is generally referred to by the reference numeral 10 and which is preferably transportable or portable. However, the enclosure of this invention could be utilized as a permanent enclosure in an area where a large number of calves are anticipated to be born. For purposes of description, the calving enclosure 10 will be described as having a forward end 12, a rearward end 14, a right or first side 16 and a left or second side 18. Generally speaking, the enclosure 10 includes a lower frame 20 and an upper frame 22. Lower frame 20 includes a longitudinally extending first frame member 24 which is preferably comprised of a tubular steel material, a second frame member 26, also preferably comprised of a tubular steel material, together with a plurality of transversely extending frame members 28, 30 and 32 which extend between the first and second frame members 24 and 26.

A plurality of vertically disposed and horizontally spaced-apart first supports or posts 34, 36, 38, 40 and 42 are secured to frame member 24 and extend upwardly therefrom while upstanding supports or posts 44, 46, 48, 50 and 52 are secured to and extend upwardly from the second frame member 26. The number of upstanding supports will depend upon the length of the enclosure and will depend upon the desired number of confinement pens or areas within the enclosure.

Upper frame 22 includes horizontally disposed and transversely extending frame members or roof supports 54, 56, 58, 60 and 62, as seen in the drawings. Frame member 54 is secured to the upper ends of supports 34 and 44 and extends laterally outwardly from support 34, as seen in the drawings. Frame member 56 is secured to the upper ends of supports 36 and 46 and extends laterally outwardly from support 36. Similarly, frame member 58 is secured to the upper ends of supports 38 and 48 while frame member 60 is secured to the upper ends of supports 40 and 60. Similarly, frame member 62 is secured to the upper ends of supports 42 and 52. Longitudinally extending and spaced-apart frame members 64 are secured to the upper ends of frame members 54, 56, 58, 60 and 62 and which extend the length of the enclosure for stability and strengthening purposes. It is preferred that a roof structure, for sheltering purposes, be positioned on the upper end of the upper frame.

A front wall structure 66 is secured to supports 34 and 44 and extends therebetween and is secured thereto by welding, bolts, etc. A left side wall structure 68 is secured to supports 44, 46, 48, 50 and 52 and extends therebetween and is secured thereto by welding, bolts, etc. A rear wall structure 70 is secured to supports 52 and 42 and extends therebetween by means of welding, bolts, etc. Normally, front wall structure 66, left wall structure 68 and rear wall structure 70 will have siding, sheeting or the like secured thereto for sheltering purposes but which has not been shown to fully illustrate the details of the enclosure. A roof structure comprised of sheets or siding is also positioned on the frame members 64 but has not been shown so that the enclosure is fully illustrated.

Support 34 has at least a pair of vertically spaced sleeves 72 and 74 provided thereon at its forward face (FIG. 3) which are adapted to have a panel 75 selectively and removably pivotally secured thereto. The rearward end of support 34 and the forward side of support 36 have suitable pivot connections thereon adapted to selectively removably and pivotally receive a panel 76 thereon. The inner sides of supports 36 and 46 have pivotal connections thereon, such as sleeves or collars, to facilitate the selectively removable and pivotal panel 78 to be connected thereto so as to extend therebetween. Similarly, a panel 80 is selectively removably and pivotally secured to supports 36 and 38 so as to extend therebetween and a selectively removable and pivotal panel 82 is secured to supports 38 and 48 so as to extend therebetween. Similarly, panel 84 is selectively removably and pivotally secured to the supports 38 and 40 and extends therebetween. Likewise, a panel 86 is selectively removably and pivotally secured to support 40 and to upstanding support 88 which is positioned inwardly of support 50. Wall 90 extends betweens supports 88 and 50 to form a front wall of a tack or warming room 92. The inner side of tack room 92 is defined by an inner wall 94 which extends between support 88 and support 96. Preferably, a floor is provided in the tack room 92 and a door 98 is provided in wall 94 to permit access to the interior of the tack room so that a person may go into the tack room to obtain equipment, get warm, or even to bring a calf thereinto for warming purposes.

Figure 1:
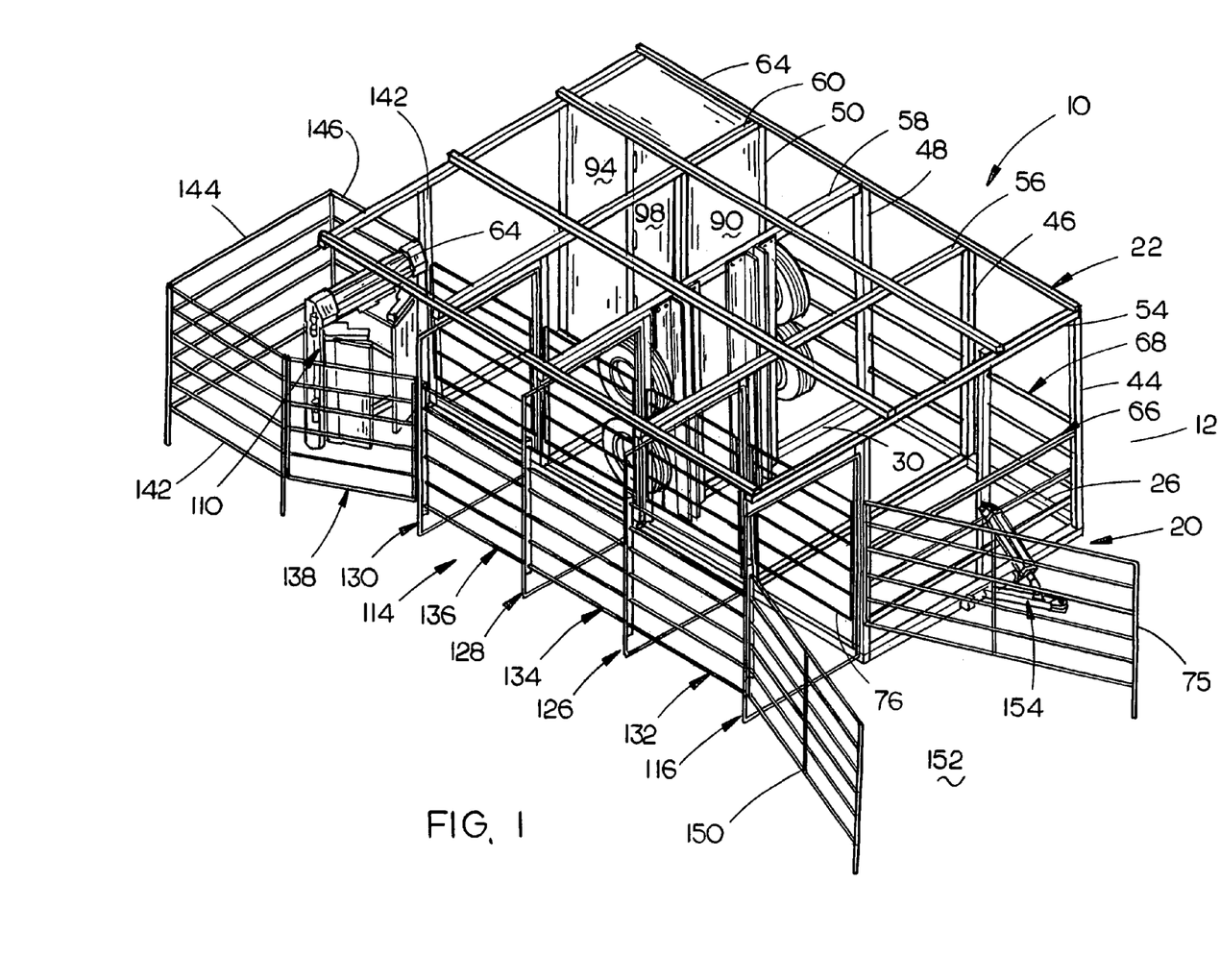
FIG. 1 is a top perspective view of the enclosure of this invention with the roof and siding removed therefrom to more fully illustrate the invention.
Figure 2:
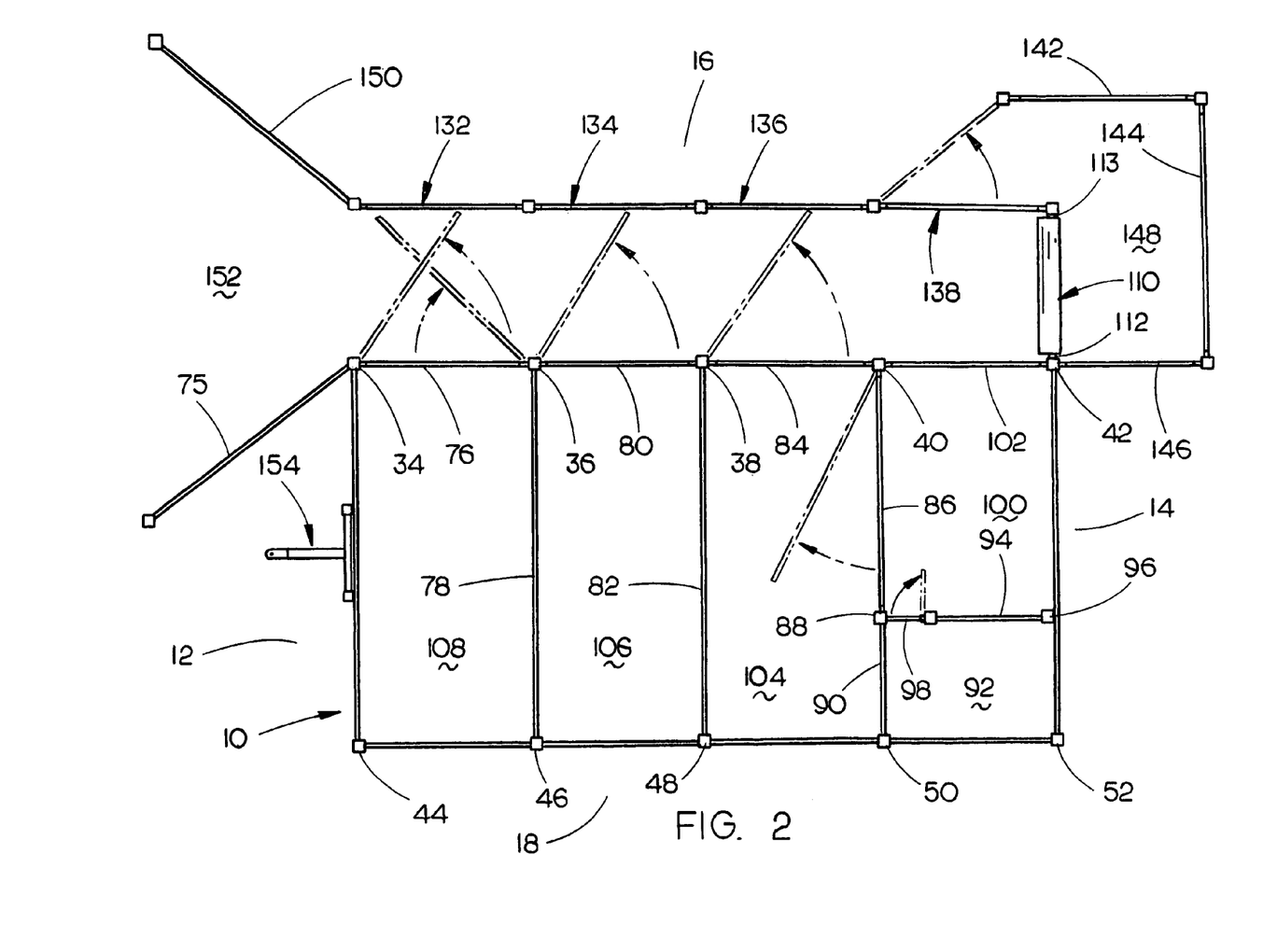
FIG. 2 is a top schematic view of the enclosure illustrating the various positions to which some of the panels may be moved.

Panel 86 may be moved from its normally transversely disposed condition wherein it extends between supports 40 and 88 to the position illustrated by broken lines in FIG. 2 so that a person has access to the area 100, the inner side of which is defined by panel 102 which is selectively removably pivotally secured to the supports 40 and 42. The panel 102 may be selectively pivotally moved from its normal longitudinally extending position wherein it extends between supports 40 and 42 (FIG. 2) to a position wherein it is positioned adjacent the rear wall structure 70 so that a person may enter or exit the pen or area 100. The panel 102 may be comprised of a bifold panel if so desired. Similarly, panel 86 is selectively pivotally movable between the position wherein it normally extends between supports 40 and 88 (FIG. 2) to the broken line position of FIG. 2 so that a person may gain access from pen or area 104 to the pen or area 100. The panel 82 may be selectively pivotally moved with respect to either supports 38 or 48 so that a cow or calf may be moved between pens 104 and 106. Similarly, panel 78 may be selectively pivotally moved with respect to either supports 36 and 46 so that a cow or calf may be moved between pen 106 and pen 108.

The numeral 110 refers to an upstanding conventional headgate assembly having an inner end 112 and an outer end 113. The inner end 112 of headgate 110 is pivotally secured, about a vertical axis, to support 42 so that it may be pivotally moved between a position wherein it is parallel to rear wall 70 or generally parallel to panel 102.

Figure 3:
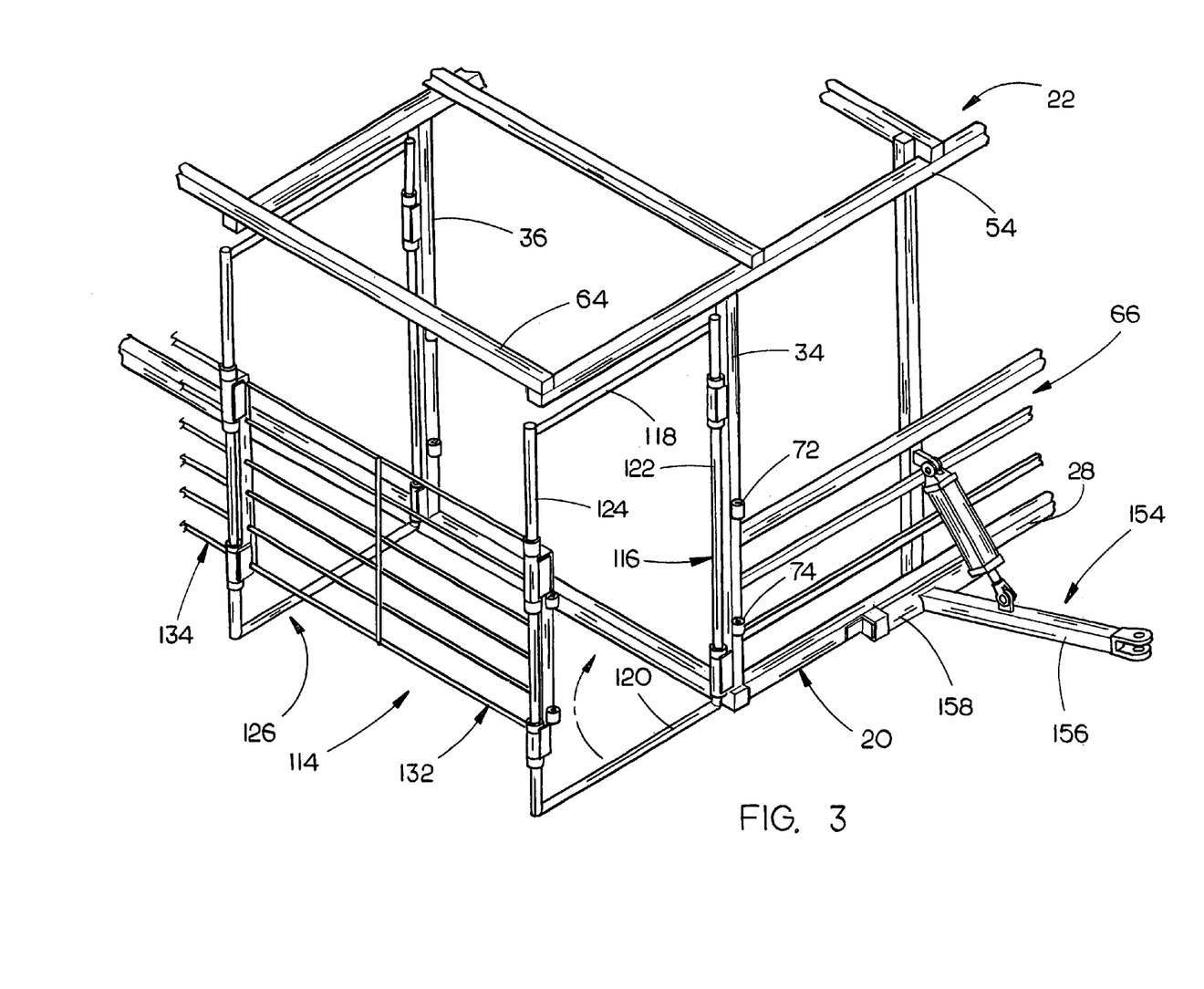
FIG. 3 is a partial front perspective view of the right front corner of the enclosure.
Figure 4:
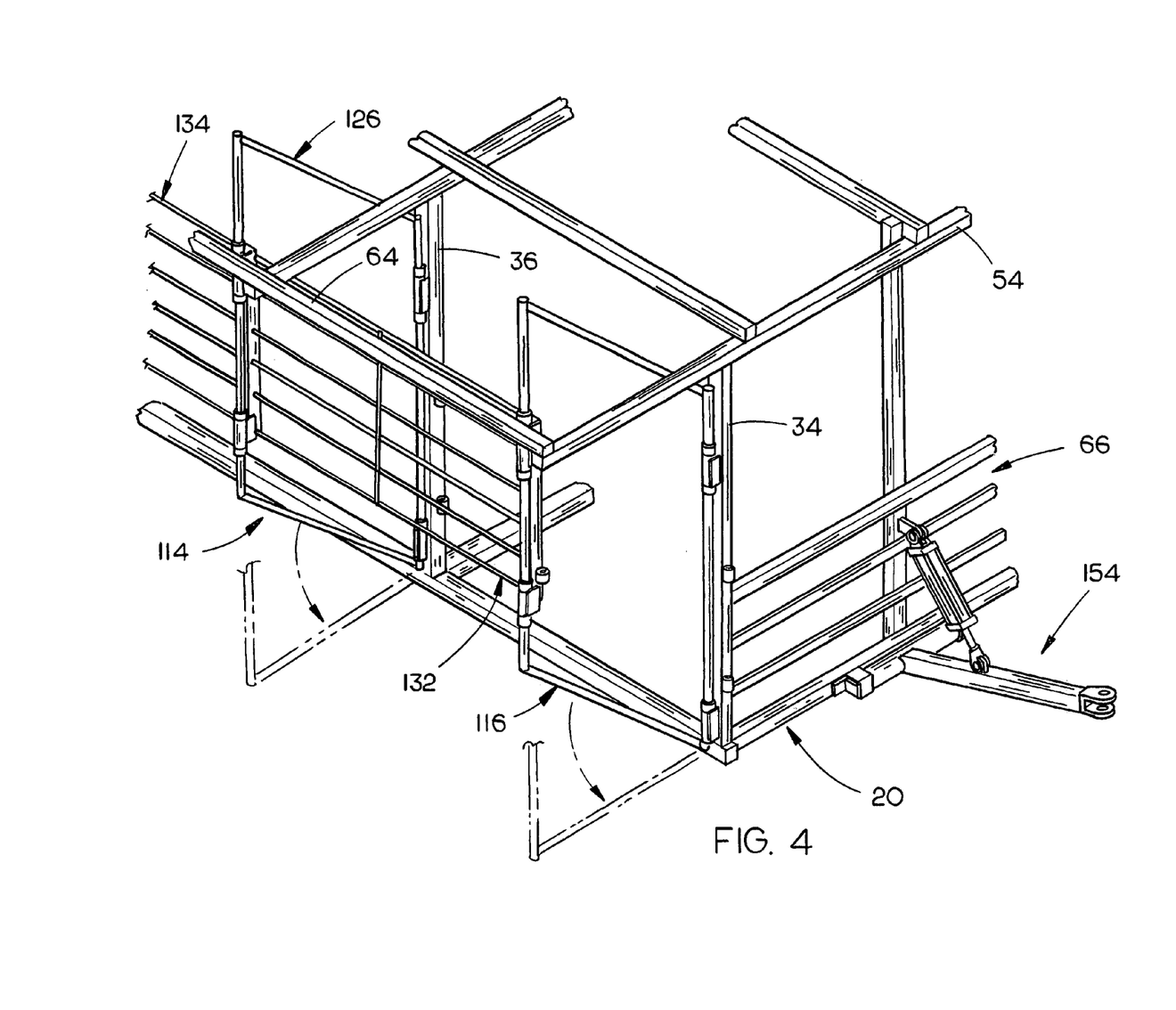
FIG. 4 is a view similar to FIG. 3 except that the alleyway has been folded to its stowed position.
Figure 5:
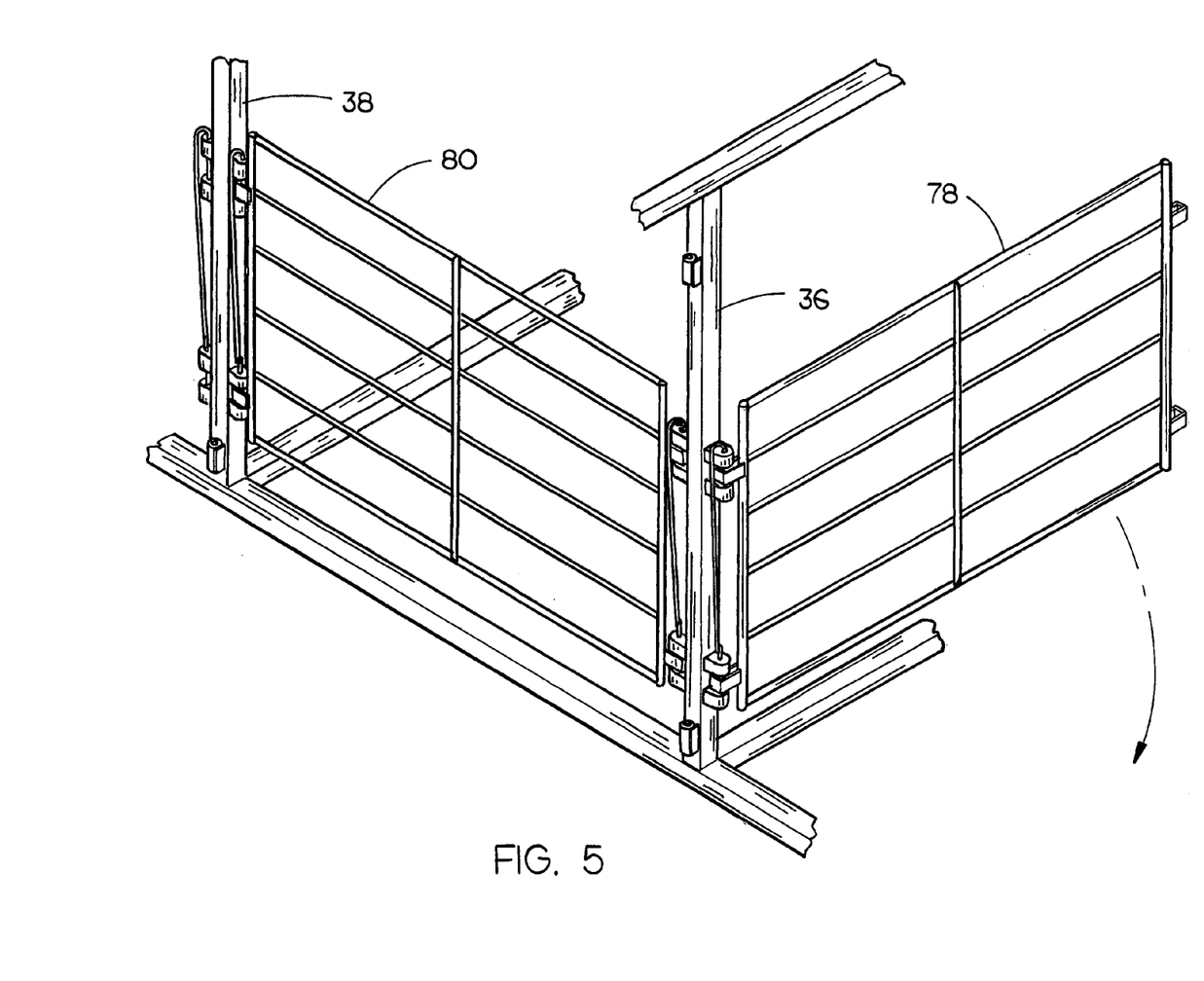
FIG. 5 is a perspective view illustrating the manner in which the panels are secured to the uprights.
Figure 6:
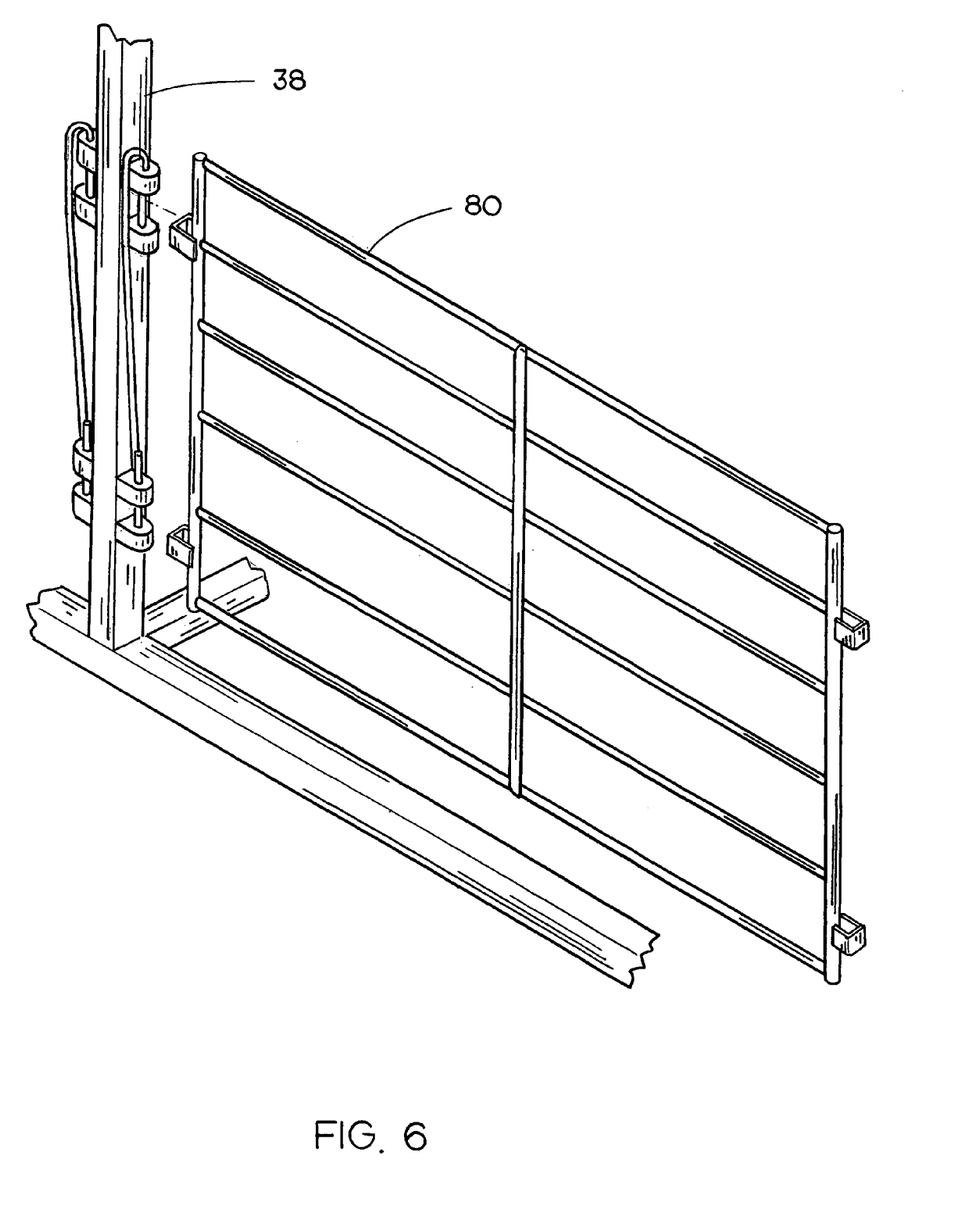
FIG. 6 is a perspective view of illustrating the manner in which one of the panels is secured to a support.
Figure 7:
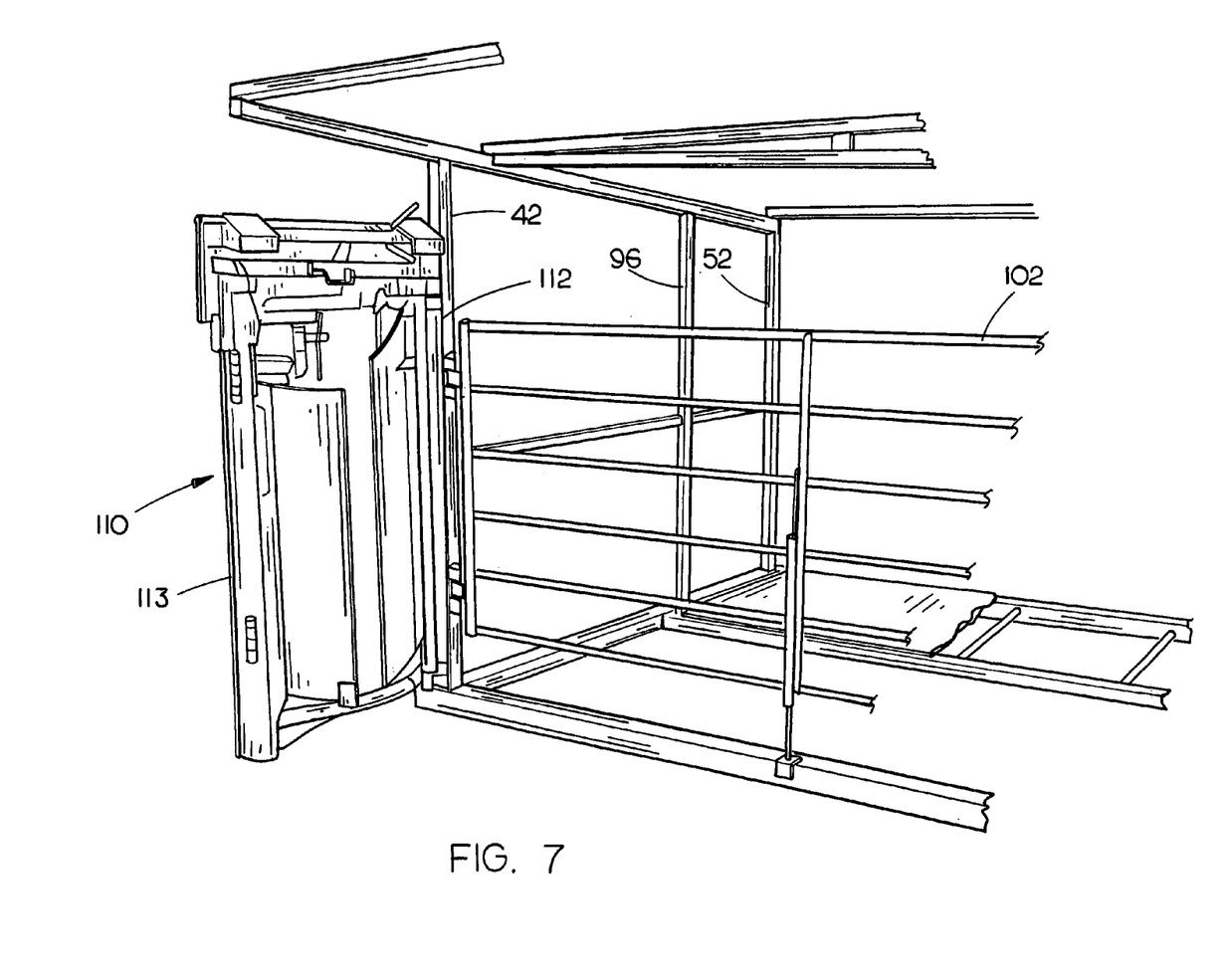
FIG. 7 is a partial perspective view of the right rear corner of the enclosure illustrating the headgate in its operative position.
Figure 8:
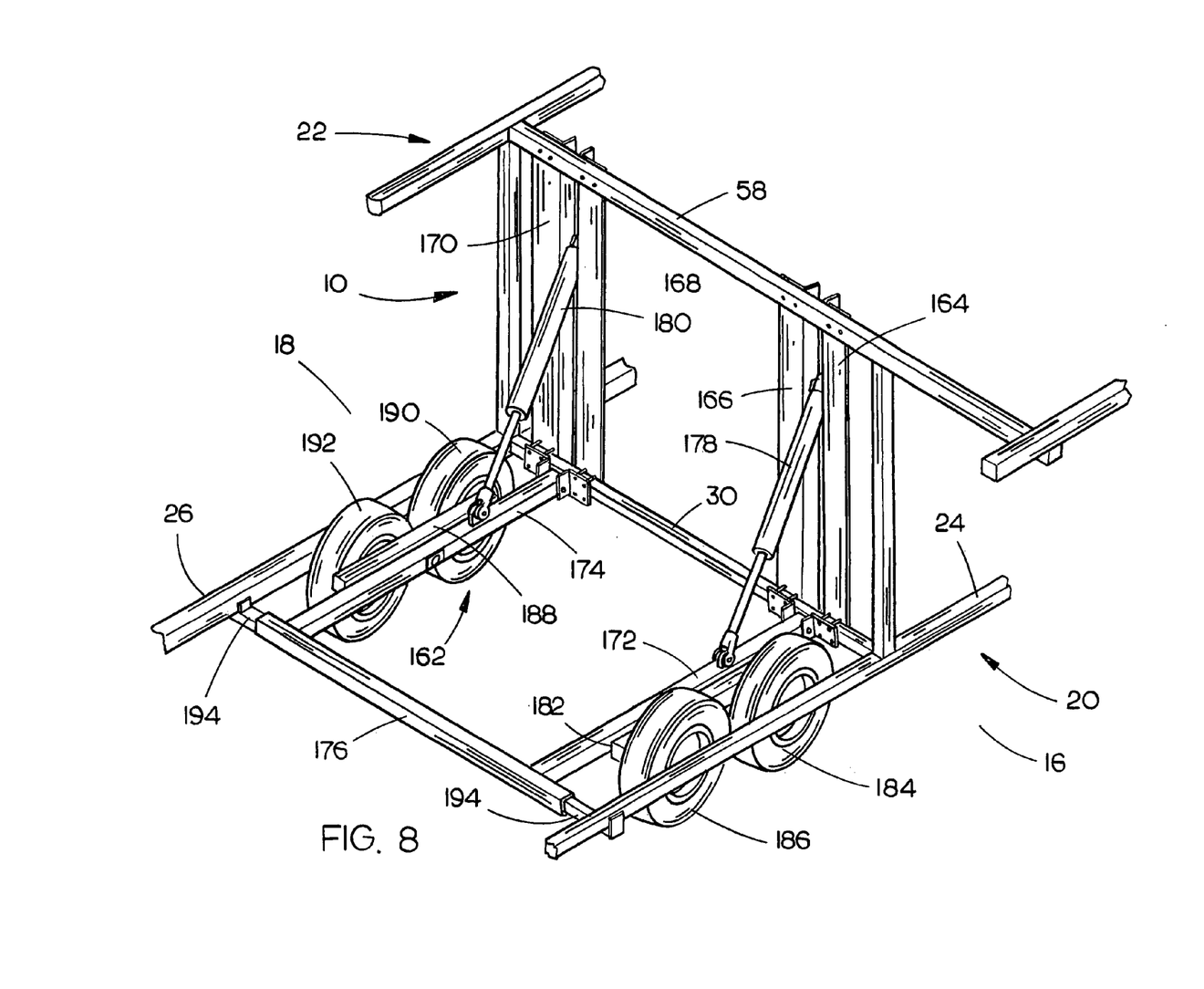
FIG. 8 is a partial rear perspective view of the retractable wheels which enable the enclosure to be moved upwardly from the ground to a transport position.
Figure 9:
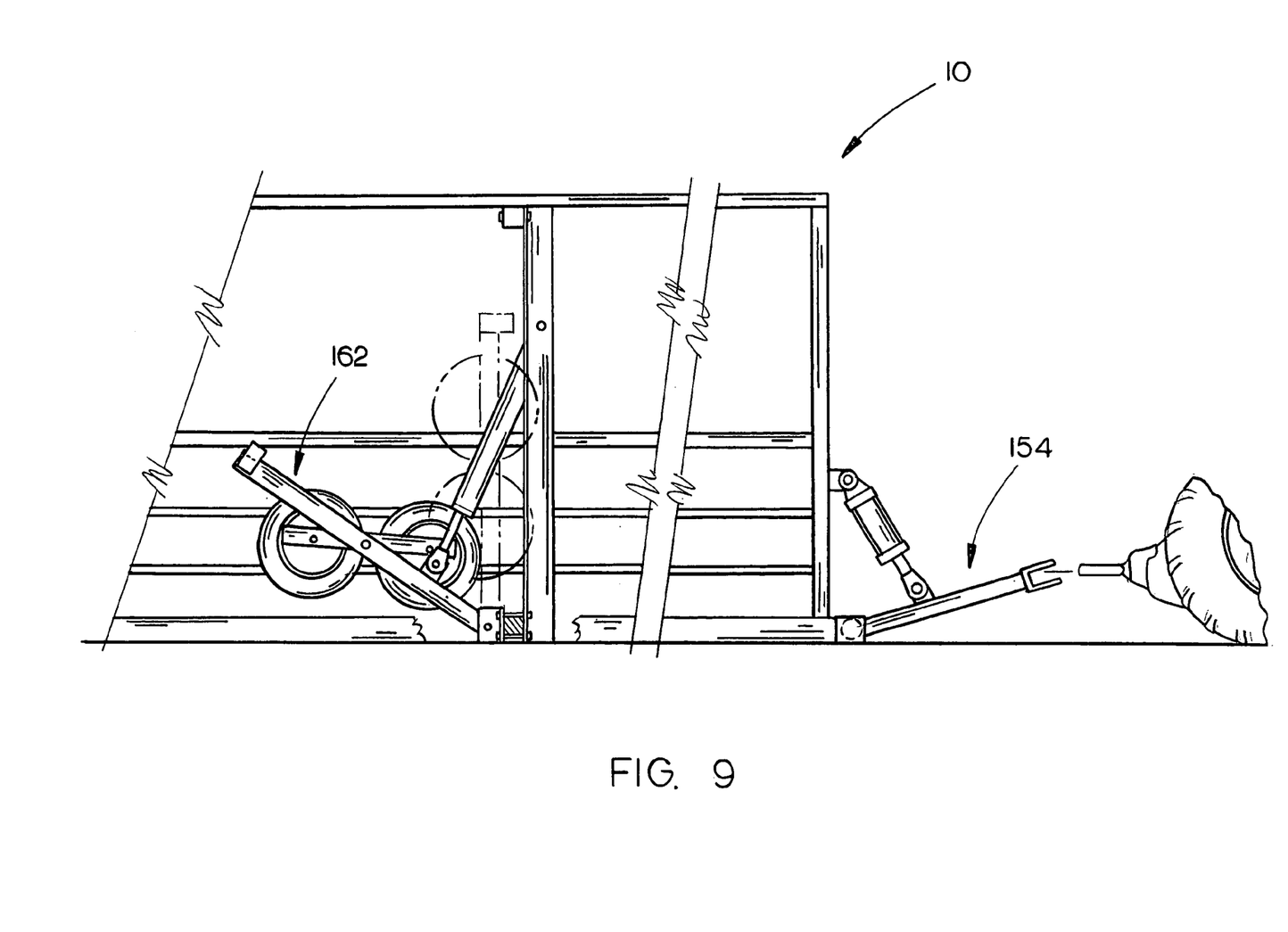
FIG. 9 is a partial side view illustrating the manner in which the retractable wheels are raised and which also illustrates the hydraulically operated front tongue.
Figure 10:
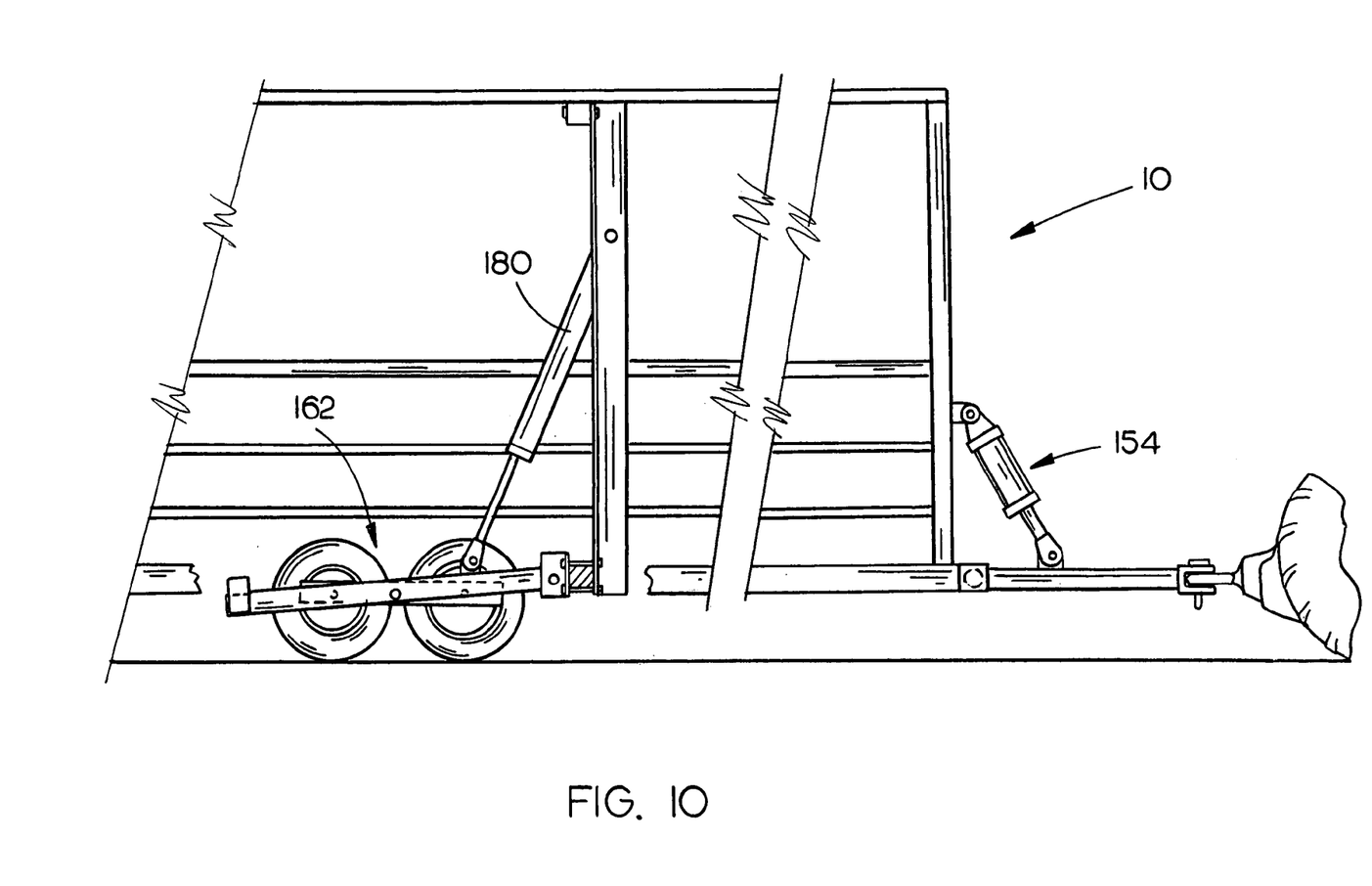
FIG. 10 is a view similar to FIG. 9 except that the retractable wheels have been lowered and the hitch has been actuated so that the enclosure is raised from the ground.
Figure 11:
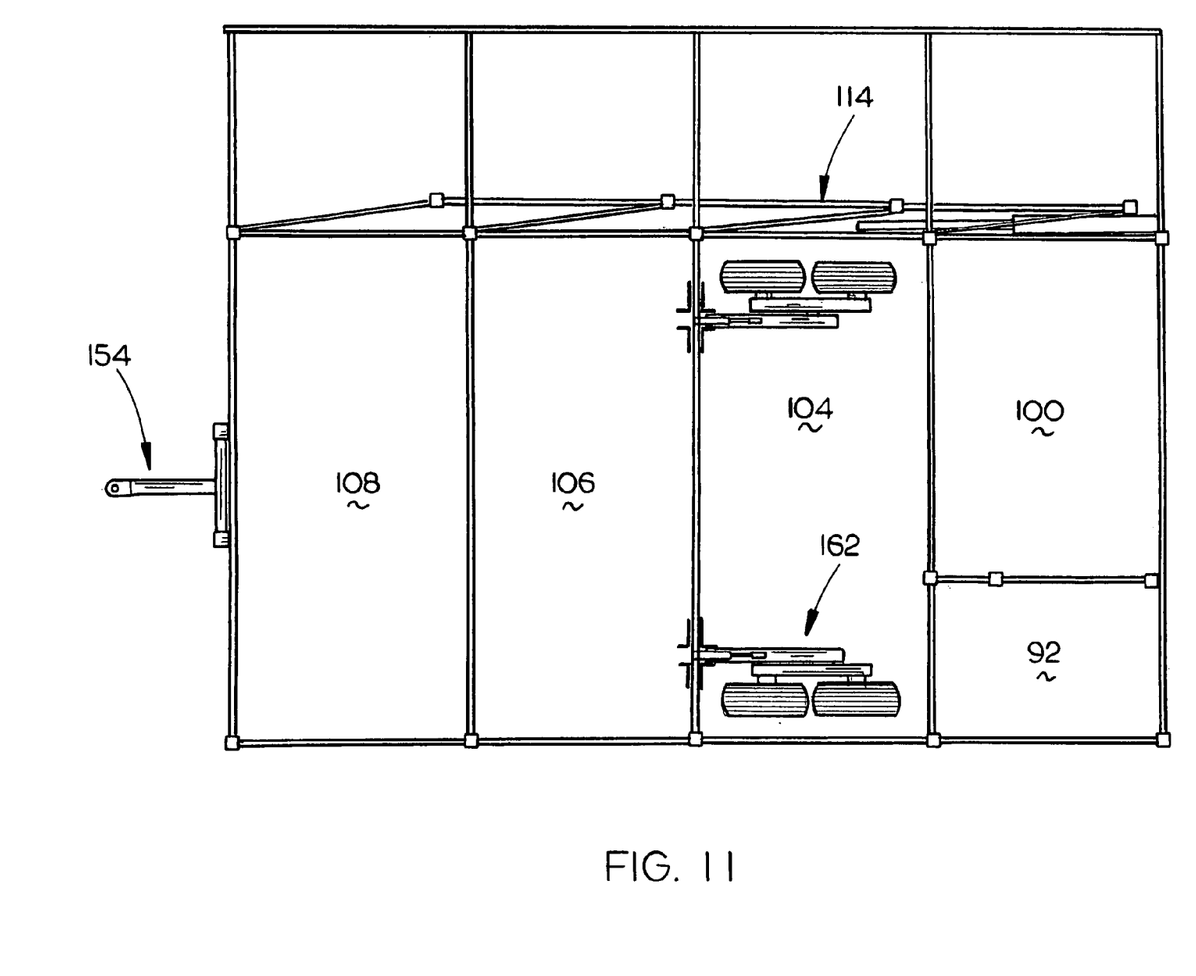
FIG. 11 is a top schematic view of the enclosure illustrating the alleyway in its stowed position.

The numeral 114 refers to an alleyway assembly which is selectively pivotally mounted at first side 16 of the enclosure 10 as will now be described. A rectangular frame 116 is pivotally or hingedly connected to the outer side of support 34 so that it may be selectively positioned wherein it is parallel to front wall structure 66 or substantially parallel to panel 76. For purposes of description, frame 116 will be described as including an upper frame member 118, lower frame member 120, inner frame member 122, and an outer frame member 124. As seen in FIG. 3, the inner frame member 122 is hingedly or pivotally secured to the support 34. Similarly, rectangular frames 126, 128 and 130, which are identical to frame 116, are pivotally or hingedly secured to supports 36, 38 and 40, respectively. Panel 132 is hingedly or pivotally connected to outer frame member 124 of frame 116 and the outer frame member of frame 126 and extends therebetween. Likewise, panel 134 is hingedly or pivotally connected to the outer frame members of frames 126 and 128. Likewise, panel 136 is hingedly or pivotally connected to the outer frame members of frames 128 and 130 and extends therebetween. The forward end of panel 138 is hingedly or pivotally connected to the rearward end of the outer frame member of frame 130. Panel 138 is selectively removably secured to the outer frame member of frame 130. The rearward end of panel 138 may be selectively removably hingedly secured to the outer end 113 of headgate 110. If desired, panels 132, 134 and 138 could be a single panel rather than three panels In the normal transport position of the enclosure, the forward end of panel 138 is disconnected from frame 130 and the headgate 110 and the panel 138 are pivoted to a position wherein they are generally parallel to and adjacent side 16 of the enclosure (FIG. 11). The frames 116, 126, 128 and 130 as well as the panels 132, 134 and 136 are then pivotally moved rearwardly and inwardly so that the alleyway assembly is positioned generally parallel to and adjacent side 16 of the enclosure. By moving the alleyway assembly to its stowed position, the overall width of the enclosure is reduced for transport purposes. Even though the transversely and horizontally extending frame members 54, 56, 58, 60 and 62 extend laterally outwardly from the right or first side 16 of the enclosure, the protruding ends of those frame members will extend over the ditch or the side of the road upon which the enclosure is being moved and will not pose an interference to oncoming or passing traffic.

When it is desired to place the enclosure into a working or functional mode, the alleyway assembly 114 is pivotally moved outwardly and forwardly from its position adjacent side 16 (FIG. 11) of the enclosure to create the alleyway or alley 140. Headgate 110 is then pivotally moved from its stowed position to its operative position (FIG. 2). The forward end of panel 138 is hingedly connected to frame 130 with the rearward end thereof being disconnected from the headgate so that the panel 138 may be pivotally moved outwardly as illustrated by broken lines in FIG. 2. Hinged panels 142, 144 and 146 are then assembled, as illustrated in FIG. 2, to create a turnaround area 148. Hinged panel 75 is then pivotally connected to support 34 and extended outwardly and forwardly therefrom, as seen in the drawings.

Similarly, a hinged panel 150 is pivotally secured to the outer frame member 124 of frame 116 and extended outwardly and forwardly therefrom to create a funnel-shaped entrance area 152.

A cow may enter the enclosure 10 by means of the funnel-shaped entrance area 152. If the cow is going to be positioned in pen 104, the forward end of panel 84 is disconnected from support 38 and pivoted so that the forward end of panel 84 is positioned closely adjacent the panel 136 to create an open path for the cow to enter pen 104. When the cow has entered pen 104, panel 84 will be closed.

Assuming that a cow is in pen 104, the cow may give birth to its calf therein if the cow does not need assistance in the delivery. If the cow needs assistance with the calving, the rearward end of panel 84 is disconnected from the support 40 and pivoted outwardly until the rearward end of the panel is positioned adjacent the panel 136. The cow is then led from the pen 104 into the alley 140 and is positioned in the headgate 110. Normally, during the positioning of the cow in the headgate 110, the panel 138 will be connected to the headgate 110 so that the cow is easily maneuvered into the headgate 110. Panel 102 may then be opened, if necessary, so that assistance may be given to the cow such as by pulling the calf therefrom. After the calf is delivered, it may be returned to the pen 104 or taken to the warm tack room 92 where the calf is cleaned, dried and warmed. If the calf is to be given its inoculations, the calf may be positioned in the alley 140 with the alleyway assembly 114 being moved towards the enclosure to squeeze the calf in position so that the inoculations may be given to the restrained calf.

Assuming that the calf is delivered while the cow is in the headgate, after the cow has delivered its calf, the rearward end of panel 138 will be disconnected from the headgate 110 and will be connected to the forward end of panel 142, as illustrated by broken lines in FIG. 2. During the delivery, with the cow restrained in the headgate 110, panel 138 may be disconnected from headgate 110 with the alleyway then being pivotally moved forwardly and inwardly to provide a more open work area at the outer side of the cow. Headgate 110 is then released or opened and the cow will pass rearwardly therethrough into the turnaround area 148 or back away from the headgate 110. The cow may then reenter the rearward end of the alley 140 and move into the pen 104 and be maintained therein by closing the panel 84. The other pens 106 and 108 may be used in an identical fashion to that just described.

Although the enclosure described above will function very well if it is erected as a permanent facility, it is preferred that the enclosure be portable which may be accomplished in one of two ways. The enclosure may be dragged or skidded from one location to another but the preferred method of providing portability to the enclosure is to provide wheels which support the enclosure above the ground to facilitate transport of the enclosure from one location to another.

The numeral 154 refers to a forwardly extending hitch including a tongue 156 which extends forwardly from a transversely extending tubular member 158 which is pivoted, about a horizontal axis, to frame member 28. The forward end of tongue 156 has a conventional hitch thereon to enable the same to be secured to the drawbar or hitch of a tractor or other prime mover. Hydraulic cylinder 160 is pivotally secured to and extends between tongue 156 and the forward end of the enclosure. With the forward end of tongue 156 secured to the drawbar or the like of a tractor or the like, and with the enclosure resting on the ground, the extension of the hydraulic cylinder 160 will cause the forward end of the enclosure to be raised from the ground. Retraction of the cylinder will cause the forward end of the enclosure to be lowered into ground engagement.

The numeral 162 refers to a retractable wheel assembly provided on the enclosure for raising and lower the enclosure with respect to the ground. Wheel assembly 162 includes a first pair of vertically disposed and horizontally spaced-apart frame members 164 and 166 which are secured at their lower ends to frame member 30 and secured at the upper ends to frame member 56. Wheel assembly 162 also includes a second pair of frame members 168 and 170 which are vertically disposed and horizontally spaced-apart and which extend between the frame members 30 and 56. The forward end of an elongated support arm 172 is pivotally connected to the lower ends of frame members 164 and 166 while an elongated support arm 174 is pivotally secured at its forward end to the frame members 168 and 170 and extends rearwardly therefrom. A transversely extending tube 176 is secured and extends between the rearward ends of the support arms 172 and 174. A first hydraulic cylinder 178 is pivotally connected to and extends between frame members 164, 166 and support arm 172 for raising and lower the support arm 172. Similarly, a second hydraulic cylinder 180 is pivotally connected to and extends between frame members 168 and 170 and support arm 174 for raising and lower the support arm 174.

Beam 182 is pivotally connected intermediate its length to the support arm 172 and has wheels 184 and 186 rotatably mounted at the opposite ends thereof. Similarly, beam 188 is pivotally connected intermediate its length to support arm 174 and has wheels 190 and 192 rotatably secured to the opposite ends thereof. Tubes 194 are slidably mounted in the opposite ends of tube 176 and have upstanding flanges or plates secured thereto which are adapted to receive the underside of the frame members 24 and 26, respectively, when the retractable wheel assembly is in its operative transport position. The retraction of the hydraulic cylinders 178 and 180 causes the wheels 184, 186, 190 and 192 to be raised from their ground engaging position to an upright stowed position outwardly of the frame members 164, 166 and 168, 170, respectively.

When it is desired to raise the enclosure to enable the same to be transported, the hydraulic cylinders 178 and 180 are extended which causes the wheels 184, 186 and 190, 192 to be lowered into ground engagement with the continued extension of the hydraulic cylinders 178 and 180 causing the enclosure to be raised from the ground. The enclosure is raised by means of the hydraulic cylinders 178 and 180 until the tube 136 is positioned below the plane of the frame members 24 and 26. The tubes 194 are then slidably moved outwardly from the opposite ends of the tube 176 until the flanges or plates thereon are positioned beneath the underside of the frame members 24 and 26. The hydraulic cylinders 178 and 180 are then retracted somewhat until the frame members 24 and 26 are received on the tubes 194. The positioning of the frame members 24 and 26 on the tubes 194 reduces the stress on the hydraulic cylinders 178 and 180 during transport and ensures that the enclosure will be positively prevented from ground engagement should a failure occur in the hydraulic cylinders or the hoses connected thereto. When the frame members 24 and 26 have been positioned on the tubes 194, the hydraulic cylinder 160 is extended to cause the forward end of the enclosure to be raised from the ground. The enclosure is now ready for transport.

When the enclosure has reached its desired location, the hydraulic cylinder 160 is retracted which causes the forward end of the enclosure to be lowered into ground engagement. The hydraulic cylinders 178 and 180 are extended somewhat so that the frame members 24 and 26 move upwardly out of engagement with the tubes 194. At that time, the tubes 194 are slidably moved inwardly into the opposite ends of the tube 176 so that the tubes 194 are out of the movable path of the frame members 24 and 26. The hydraulic cylinders 178 and 180 are then retracted to lower the enclosure onto the ground and to raise the wheels 184, 186, 190 and 192 to their upright stowed position.

Figure 12:
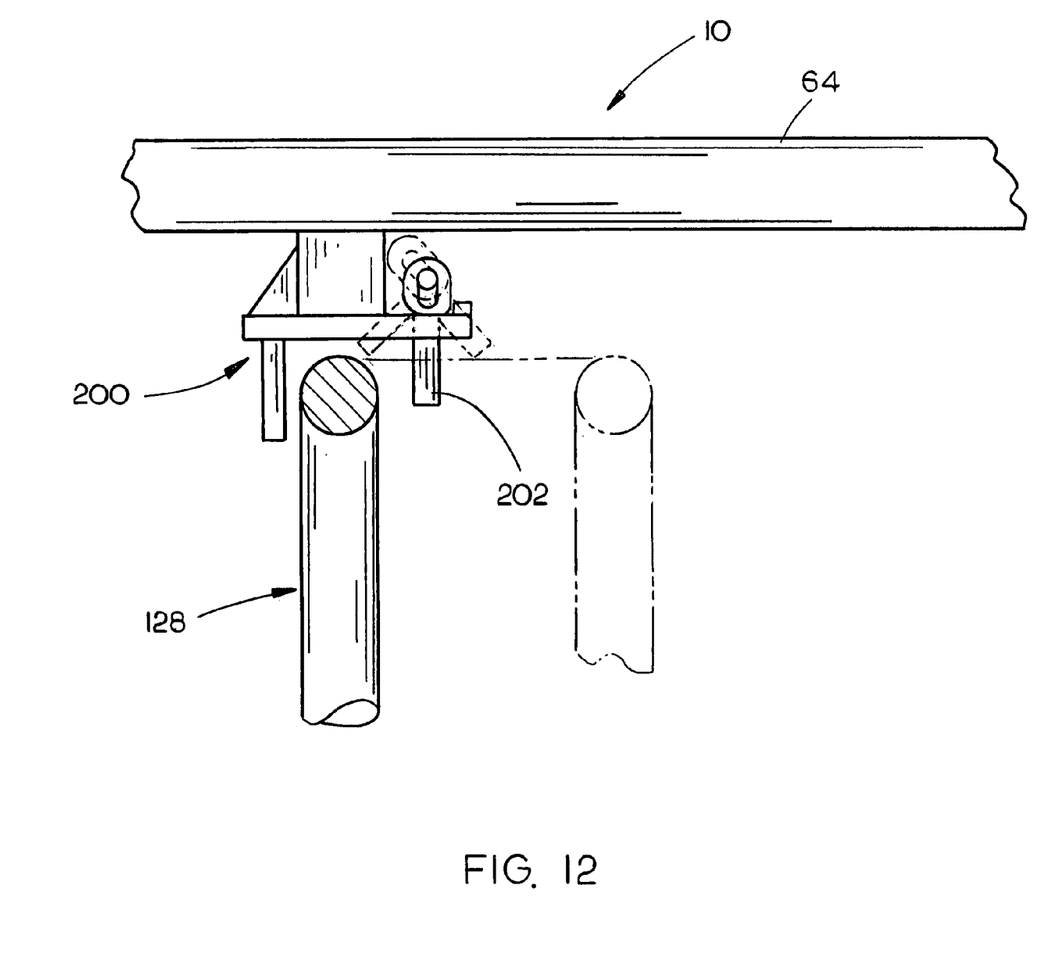
FIG. 12 is a side elevational view illustrating the manner in which the alleyway is locked in its operative position.

The alleyway assembly 114 is then pivotally moved to its operative position as previously described and the panels 75 and 150 are assembled into the funnel-like entrance area 152. Similarly, panels 142, 144 and 146 are positioned as previously described to provide the turnaround area 148. The panels 75, 150, 142, 144 and 146, when removed from the enclosure, may be stored on the support 196 which projects rearwardly from the front wall of the enclosure. The alleyway assembly is selectively locked into its operative position by means of the locking mechanism 200 illustrated in FIG. 12. Locking mechanism 200 is secured to the overhanging frame member 64 with the upper frame member of frame 128 being received therein and selectively maintained therein by the latch arm 202. The frame 128 may be released from locking mechanism 200 by moving the latch arm 202 upwardly, as seen in FIG. 11.

Thus it can be seen that the invention accomplishes at least all of its stated objectives.

I claim:

1. A calving enclosure, comprising:
   a generally horizontally disposed lower frame having a rearward end, a forward end, a first side and a second side;
   an upper frame positioned above said lower frame having a rearward end, a forward end, a first side and a second side;
   a plurality of upstanding, horizontally spaced-apart first supports, having upper and lower ends;
   said lower ends of said first supports being secured to said lower frame;
   said upper ends of said first supports being operatively connected to said upper frame;
   said first supports having a height sufficient to permit persons and cows to move within the enclosure;
   a front wall at the forward ends of said lower and upper frames;
   a rear wall at the rearward ends of said lower and upper frames;
   an upstanding first side wall at said first side of said lower frame;
   an upstanding second side wall at said second side of said lower frame;
   said first side wall being comprised of a plurality of individually hingedly mounted panels;
   a plurality of individually hingedly mounted panels secured to and extending between said first and second side walls to define a plurality of pens within the enclosure which are accessible when said panels of said first side wall are hingedly opened;
   and a tack or warming room provided in the enclosure; and an alleyway assembly selectively pivotally mounted on said first side wall; said alleyway assembly being movable from a stowed position adjacent said first side wall to an operative position outwardly of said first side wall to create an alleyway having forward and rearward ends outwardly of said first side wall.

2. The enclosure of claim 1 wherein the enclosure includes a selectively vertically movable wheel assembly, movable between first and second positions, for raising the rear enclosure from the ground for transport purposes.

3. The enclosure of claim 2 wherein a powered pivotal hitch is provided at the forward end of said lower frame which assists in raising and lower the enclosure.

4. The enclosure of claim 2 wherein said wheel assembly includes a pair of first wheels adjacent said first side of said lower frame and a pair of second wheels adjacent said second side of said lower frame.

5. The enclosure of claim 2 wherein said wheel assembly is selectively vertically moved by a powered ram.

6. The enclosure of claim 5 wherein said powered ram comprises a hydraulic cylinder.

7. The enclosure of claim 2 wherein a locking device is provided for selectively locking said wheel assembly in its said second position.

8. A calving enclosure, comprising:
a generally horizontally disposed lower frame having a rearward end, a forward end, a first side and a second side;
an upper frame positioned above said lower frame having a rearward end, a forward end, a first side and a second side;
a plurality of upstanding, horizontally spaced-apart first supports, having upper and lower ends;
said lower ends of said first supports being secured to said lower frame;
said upper ends of said first supports being operatively connected to said upper frame;
said first supports having a height sufficient to permit persons and cows to move within the enclosure;
a front wall at the forward ends of said lower and upper frames;
a rear wall at the rearward ends of said lower and upper frames;
an upstanding first side wall at said first side of said lower frame;
an upstanding second side wall at said second side of said lower frame;
said first side wall being comprised of a plurality of individually hingedly mounted panels;
a plurality of individually hingedly mounted panels secured to and extending between said first and second side walls to define a plurality of pens within the enclosure which are accessible when said panels of said first side wall are hingedly opened;
and an alleyway assembly selectively pivotally mounted on said first side wall;
said alleyway assembly being movable from a stowed position adjacent said first side wall to an operative position outwardly of said first side wall to create an alleyway having forward and rearward ends outwardly of said first side wall.

9. The enclosure of claim 8 wherein said alleyway assembly comprises a plurality of panel members operatively pivotally secured to said first side wall.

10. The enclosure of claim 8 wherein a headgate is provided at said rearward end of said alleyway.

11. The enclosure of claim 10 wherein said headgate is pivotally mounted to said first side wall and is selectively movable between a stowed position adjacent said first side wall and a working position extending transversely from said first side wall.

12. The enclosure of claim 8 wherein said upper frame extends over said alleyway.

13. A calving enclosure, comprising:
a generally horizontally disposed lower frame having a rearward end and a forward end and including a rear frame member, a front frame member, a first side frame member and a second side frame member;
an upper frame positioned above said lower frame having a rearward end and a forward end, a first side and a second side and including a rear frame member, a front frame member, a first side frame member and a second side frame member;
a plurality of upstanding, horizontally spaced-apart first supports, having upper and lower ends;
said lower ends of said first supports being secured to said first side frame member of said lower frame;
said upper ends of said first supports being operatively connected to said first side frame member of said upper frame;
a plurality of upstanding, horizontally spaced-apart second supports, having upper and lower ends;
said lower ends of said second supports being secured to said second side frame member of said lower frame;
said upper ends of said second supports being secured to said second side frame member of said upper frame;
said first and second supports having a height sufficient to permit persons and cows to move in the enclosure;
a front wall at the forward ends of said lower and upper frames;
a rear wall at the rearward ends of said lower and upper frames;
an upstanding first side wall at said first side of said lower frame;
an upstanding second side wall at said second side of said lower frame;
and a plurality of panels secured to and extending between at least some of said first supports and said second supports to define a plurality of areas within the enclosure;
said first side frame member of said upper frame being disposed laterally outwardly of said first side frame member of said lower frame; and an alleyway assembly selectively pivotally mounted on said first side wall; said alleyway assembly being movable from a stowed position adjacent said first side wall to an operative position outwardly of said first side wall to create an alleyway having forward and rearward ends outwardly of said first side wall.

14. The enclosure of claim 13 wherein a roof is supported upon said upper frame.

15. A calving enclosure, comprising:
a generally horizontally disposed lower frame having a rearward end and a forward end and including a rear frame member, a front frame member, a first side frame member and a second side frame member;
an upper frame positioned above said lower frame having a rearward end and a forward end, a first side and a second side and including a rear frame member, a front frame member, a first side frame member and a second side frame member;
a plurality of upstanding, horizontally spaced-apart first supports, having upper and lower ends;
said lower ends of said first supports being secured to said first side frame member of said lower frame;
said upper ends of said first supports being operatively connected to said first side frame member of said upper frame;

a plurality of upstanding, horizontally spaced-apart second supports, having upper and lower ends;
said lower ends of said second supports being secured to said second side frame member of said lower frame;
said upper ends of said second supports being secured to said second side frame member of said upper frame;
said first and second supports having a height sufficient to permit persons and cows to move in the enclosure;
a front wall at the forward ends of said lower and upper frames;
a rear wall at the rearward ends of said lower and upper frames;
an upstanding first side wall at said first side of said lower frame;
an upstanding second side wall at said second side of said lower frame;
and a plurality of panels secured to and extending between at least some of said first supports and said second supports to define a plurality of areas within the enclosure;
one of said areas being a tack or warming room; and an alleyway assembly selectively pivotally mounted on said first side wall; said alleyway assembly being movable from a stowed position adjacent said first side wall to an operative position outwardly of said first side wall to create an alleyway having forward and rearward ends outwardly of said first side wall.

16. The enclosure of claim 15 wherein the enclosure includes a selectively vertically movable wheel assembly, movable between first and second positions, for raising the enclosure from the ground for transport purposes.

17. The enclosure of claim 16 wherein a powered hitch is provided at the forward end of said lower frame which assists in raising and lower the enclosure.

18. The enclosure of claim 16 wherein said wheel assembly includes a pair of first wheels adjacent said first side of said lower frame and a pair of second wheels adjacent said second side of said lower frame.

19. The enclosure of claim 16 wherein said wheel assembly is selectively vertically moved by a powered ram.

20. The enclosure of claim 19 wherein said powered ram comprises a hydraulic cylinder.

21. The enclosure of claim 16 wherein a locking device is provided for selectively locking said wheel assembly in its said second position.

22. A calving enclosure, comprising:
a generally horizontally disposed lower frame having a rearward end and a forward end and including a rear frame member, a front frame member, a first side frame member and a second side frame member;
an upper frame positioned above said lower frame having a rearward end and a forward end, a first side and a second side and including a rear frame member, a front frame member, a first side frame member and a second side frame member;
a plurality of upstanding, horizontally spaced-apart first supports, having upper and lower ends;
said lower ends of said first supports being secured to said first side frame member of said lower frame;
said upper ends of said first supports being operatively connected to said first side frame member of said upper frame;
a plurality of upstanding, horizontally spaced-apart second supports, having upper and lower ends;
said lower ends of said second supports being secured to said second side frame member of said lower frame;
said upper ends of said second supports being secured to said second side frame member of said upper frame;
said first and second supports having a height sufficient to permit persons and cows to move in the enclosure;
a front wall at the forward ends of said lower and upper frames;
a rear wall at the rearward ends of said lower and upper frames;
an upstanding first side wall at said first side of said lower frame;
an upstanding second side wall at said second side of said lower frame;
a plurality of panels individually hinged to and extending between at least some of said first supports and said second supports to define a plurality of areas within the enclosure;
and an alleyway pivotally mounted adjacent said at least some of said first supports;
said alleyway assembly being movable from a stowed position to an operative position to create an alleyway having forward and rearward ends outwardly of said first side wall; wherein a headgate is provided at said rearward end of said alleyway.

23. The enclosure of claim 22 wherein said alleyway assembly comprises a plurality of panel members operatively pivotally secured to said first supports.

* * * * *